April 11, 1961 L. KOSTEN 2,979,569

TELECOMMUNICATION SYSTEM

Filed June 8, 1953 3 Sheets-Sheet 1

INVENTOR:
LEENDERT KOSTEN.
BY Hugh A. Kirk
ATTY.

INVENTOR:
LEENDERT KOSTEN.
BY Hugh A. Kirk
ATTY.

TELECOMMUNICATION SYSTEM

Filed June 8, 1953 3 Sheets-Sheet 3

INVENTOR:
LEENDERT KOSTEN.
BY Hugh A. Kirk
ATTY.

United States Patent Office 2,979,569

Patented Apr. 11, 1961

2,979,569

TELECOMMUNICATION SYSTEM

Leendert Kosten, The Hague, Netherlands, assignor to Staatsbedrijf der Posterijen, Telegrafie en Telefonie, The Hague, Netherlands Filed June 8, 1953, Ser. No. 360,304

Claims priority, application Netherlands June 9, 1952

2 Claims. (Cl. 179—7)

This invention relates to a telecommunication system containing mnemotechnic means. More particularly, it deals with such a system for recording variable data regarding the subscribers to said system, such as for example, recording accumulatively the number of telephone calls and/or their tariff rates by weighted time pulses multiplied according to the distance of the call. In the examples to be described, the recording and reading of the metering impulses will only be dealt with, but of course this is not a limitation to the scope of this invention.

It is an object of this invention to produce an efficient, effective, economic and simple mnemotechnic means for a telecommunication system and/or an electronic calculator.

Another object of this invention is to produce a mnemotechnic means in which the importance of the counting sequence is not the same in all the drum cycles, but varies according to a predetermined pattern.

In a given example of an exchange according to this invention, the subscribers are arranged in groups, e.g. 100, the metering wires of the subscribers of each group being connected separately and successively by means of a multistage timing circuit. Said timing circuit is controlled by systems of co-ordinate impulses and the output of said circuit controls the supply of metering impulses to a metering device, which carries out the centeral metering and comprises a series adder. A first input of said series adder is connected to the output of a distributing device, and an output is connected to a recording head of a magnetic drum. A reading head of said same track on the drum connected to a second input of said adder in such a way that a loop is formed between the output and second input of said adder, which loop is interrupted between the said recording and reading heads. Impulses may be taken off the drum by the reading head and recorded again via the adder and the recording head, in such a way that if metering impulses are supplied to the adding device and added to those obtained from the second input, the recording head will record on the drum a correspondingly larger number of impulses. The speed of the impulses passing around the loop circuit in which the adding device is located is in such a proportion to the speed of the drum that in recording the new number of impulses the old number is exactly replaced; however, if no metering impulse is supplied, there is no need for replacing the old number.

In order to prevent disturbance of the reading system by the recording system, it is generally necessary to introduce a delay unit in the said loop system.

The code in which the unit calls of the subscribers are recorded is arbitrary and may be either binary, decimal, biquinary, etc. In the given example the code is a binary one and the binary digits are recorded on the drum in such a way that the least important ones will be read first.

The adding device has an additional and third input for timing impulses which determine its rhythm.

The timing impulses which control gates in the input of the adding device may ensure the correct shape for the input impulses, and an impulse generator (circuit) supplies all the said timing impulses.

The metering impulses supplied to the metering wires are of a predetermined duration, and they are produced in the connecting circuit, but their beginning is determined by one or more distributors.

The drum cycle is coupled with the impulse generator cycle and the cycles of the said distributors so that:

(*a*) Coincidence is ensured between the scanning of the metering wire of a subscriber by the timing circuit and the reading of the preceding metering total of this subscriber from the drum;

(*b*) The correct number of impulses is recorded.

Particularly with respect to what precedes (*b*), it is observed that, by a suitable timing and delaying of impulses going from the scanning circuit to the adding device, the importance of the counting can be given any arbitrary multiple of the unit value. The said delays in the impulse delivery can depend on a number of distributors, in such a way that the said importance is not the same in all the drum cycles, but varies according to a predetermined pattern.

Distributors having different phases with respect to said pattern can be selected according to the zone selected by a connecting circuit in order that the metering impulses occur in such phases of the said pattern that they have an effect on the importance corresponding with the tariff chosen.

The above mentioned and other features and objects of this invention and the manner of attaining them will become more apparent and the invention itself will be best understood by reference to the following embodiments of the invention taken in conjunction with the accompanying drawings, wherein.

Figure 1:
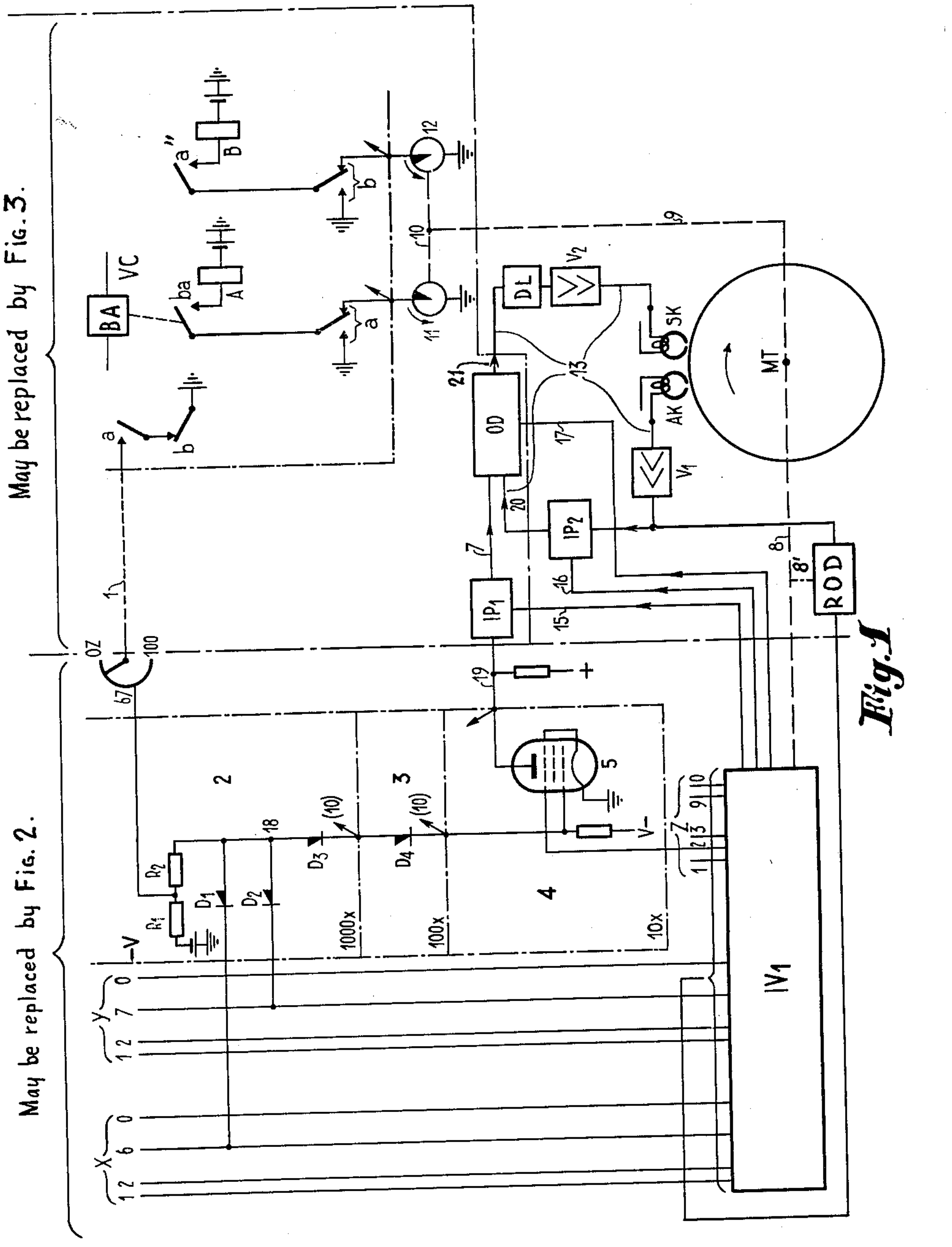
Fig. 1 is a schematic wiring diagram of an embodiment of the telecommunication system of this invention showing how the number of calls made by each subscriber may be accumulatively recorded, and where portions of the system may be interchanged with the modifications thereof shown in Figs. 2 and 3.

In Fig. 1 the lines of 1000 subscribers are grouped on contact banks of 100-point line finders OZ, the various connections being led via the cross point connection, such as a diode gating relay cell (described in Snijders copending U.S. patent application, filed July 25, 1952, now U.S. Patent No. 2,934,603, issued April 26, 1960, and assigned to the same assignee as this application) circuits 2, of which there are 10 groups of 100 each; the outputs thereof—multipled in groups of 10—are connected via the extra de-coupling rectifiers D3—of which there are 100 and the outputs of which are likewise multipled in groups of 10—to the input of a vacuum tube 5. The outputs of 10 of these tubes are connected collectively via the input gate $IP_1$ to the input 7 of the first adding device OD.

The impulse generator $IV_1$, which may comprise a plurality of coupled phonic wheels to generate the periodic pattern of synchronizing pulses fed to the leads *x*1 through *x*0, *y*1 through *y*0, *z*1 through *z*0, 15, 16, and 17, is coupled by means of shafts 8, 9, 10 to the magnetic drum MT (which has sections arranged in tracks thereon corresponding to each subscriber) and to the distributor contacts 11 and 12. The impulses supplied via conductors 15 and 16 to gates $IP_1$ and $IP_2$ and via conductor 17 to the adding device for timing the operation of the latter are also adjusted to the general synchronism, the result of which will be set forth below.

During the interval between the first closures of shaft contacts 11 and 12 following the closing of contact *ba* of answering relay BA, relay A operates (this operation occurs in the beginning of the said interval); relay B will not be energized until the end of the interval. The interval of *t* seconds between the operations of relays A and B corresponds to a complete revolution of the drum. Thus the distributor contacts or commutators 11 and 12 insure that the circuit VC of each subscriber is connected to the drum MT during one revolution of the drum, and one revolution only, during which revolution one paying unit is added to that particular subscriber's account, such as being recorded as an impulse in the section of the magnetic tape on the drum synchronized to correspond with that subscriber according to the last digits of his number as controlled by the multi-stage timing circuit and input generator $IV_1$. During this interval, the positive terminal of the battery will be applied to a wiper of line finder OZ, which is at bank contact 67, supposing these digits are the last two digits of the calling subscriber's number. As a result of this, positive potential is applied to the diode gating relay cell comprising resistors R1 and R2 and rectifiers D1 and D2, which are connected, respectively, to conductor 6 in the tens co-ordinate group *x* and conductor 7 in the units co-ordinate group *y*. The common point 18 will only become positive at the moment determined by these co-ordinates, consequently at moment 67 of the impulse generator $IV_1$.

This positive impulse will reach the grid of a tube 5, which becomes conductive in consequence, if the timing co-ordinate Z also supplies a positive voltage at this moment. The negative impulse thus applied to the common point 19 will reach the first input 7 of the adding device OD via the impulse gate $IP_1$, which is periodically opened for *t* milliseconds at the highest repetition frequency occurring at point 19 under the influence of clock impulses on conductor 15.

The second input 20 of the adding device OD, which forms part of loop 13, is fed from the reading head AK via amplifier V1 at moments determined by clock impulses, which cause impulse gate $IP_2$ to become conductive; in consequence of this the impulses applied to conductor 20 are formed or produced so that they cooperate with impulses applied to input 7 in order to obtain at output 21 the new metering totals, which feed via the delay circuit DL and the amplifier V2 the recording head SK.

Thus in loop 13 at conductor 20 there arrives from the reading head AK the old metering total of the subscriber indicated by the *x*, *y* and *z* co-ordinates and if a metering impulse is received via the reduction stages or multi-stage tuning gates 2, 3 and 4, the increased meter total is substituted via amplifier V2 and recording head SK on the track of drum MT, so that the old total is wiped out.

Figures 2, 4:
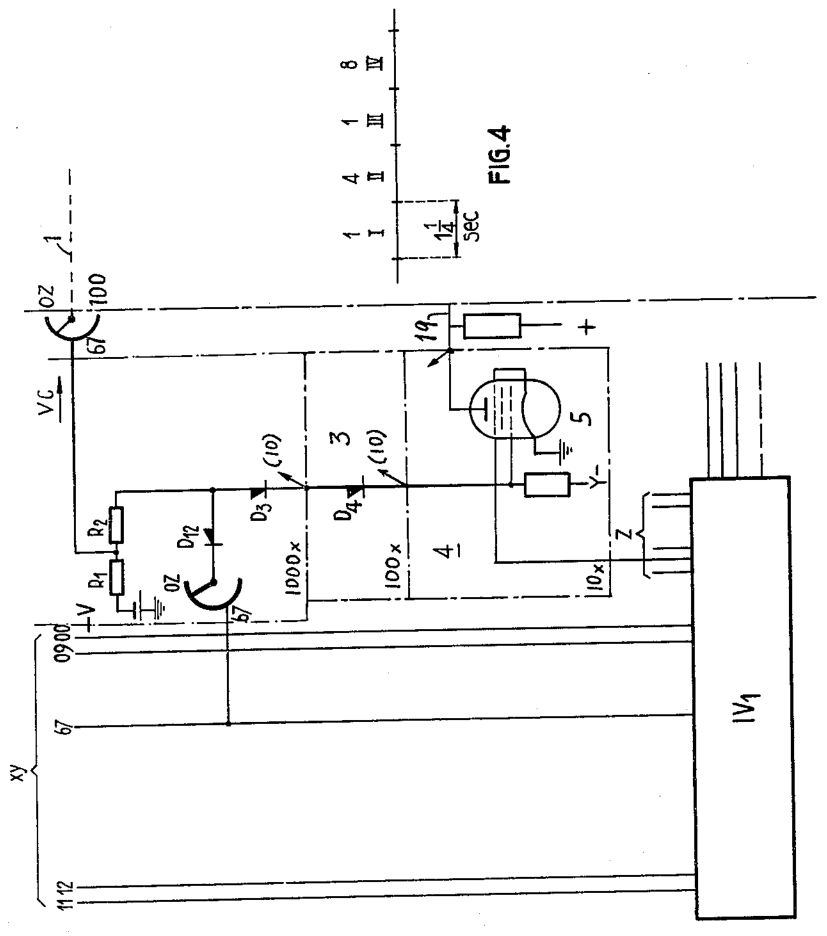
Fig. 2 is a schematic wiring diagram of a modification of the multi-stage timing circuit of Fig. 1, in particular, the reduction stages thereof.
Fig. 4 is a schematic timing diagram of the cycles of the commutators shown in Fig. 3.

According to the modification of Fig. 2 of the multistage tuning circuit or reduction stages of Fig. 1, the impulse generator $IV_1$ produces timing impulses on 100 outlets *xy* in the banks of line finders OZ, the wipers constituting the inputs of the diode gating relay cells. The diode gating relay cells are constituted by rectifiers as D12, D3 and resistors as R1, R2. The relay outlets, multipled in tens, lead to points 19 through an electronic or vacuum tube 5, as shown in Fig. 1, which feed the adding device in a manner as described above.

The circuit of Fig. 2 works as follows (supposing the last two digits of the calling subscriber's number are 67):

In the interval determined by generator $IV_1$ for the metering of subscribers . . . 67, the 67 wire bears positive potential and if there arrives a positive metering impulse from the connecting circuit (which may be connected to the dashed line conductor 1) to connecting circuit VC, a positive impulse will be applied to the common output of the relay cells belonging to the line finders of 100 subscribers; this impulse being filtered or gated again by the last timing stage (tube 5) according to Fig. 1.

Figure 3:
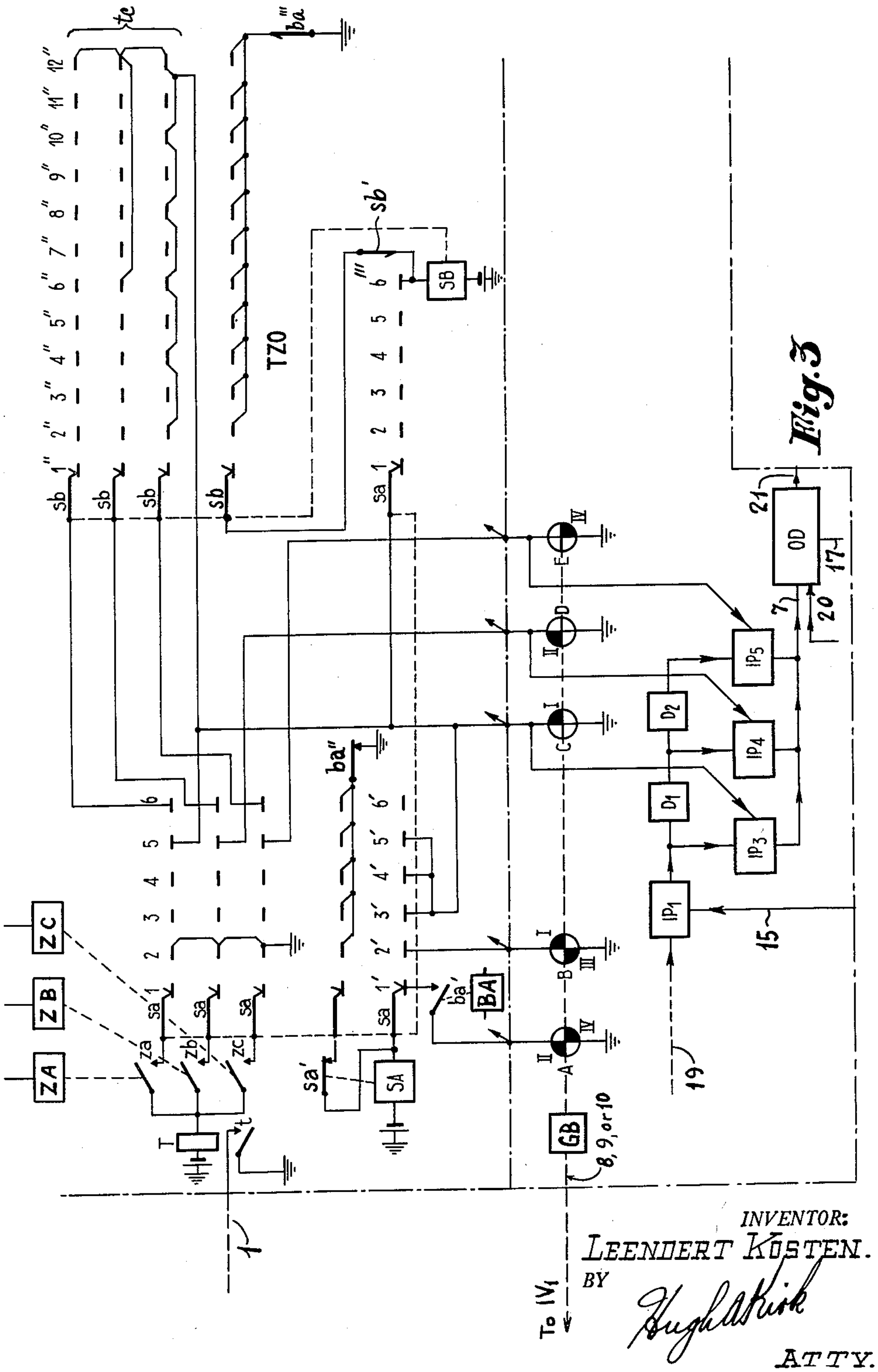
Fig. 3 is a schematic wiring diagram of a modification of the upper right-hand portion of the circuit of Fig. 1, adapted for the recordation of different tariff rates according to the different distances of calls.

Fig. 3 shows a zone metering circuit or one for recording tariff rates according to the different distances of calls being made, which can be used in an exchange together with the drum circuit shown in Fig. 1 or 2. The dotted line conductor 1 extending to the left in Fig. 3 may be connected to the dashed line conductor 1 running to the right in Fig. 1 or 2. The common output of vacuum tubes 5 can be connected to the dotted line conductor 19 in the lower half of Fig. 3, which leads to the impulse gate $IP_1$. The series counter OD has a first input 7, and a second one, 20, as well as a timing input 17, just as indicated in Fig. 1. The drum and the circuits belonging to it are also equal to those of Fig. 1.

The tariff circuit of Fig. 3 comprises the wipers *sb*, which are controlled step by step by magnet SB, and the wipers *sa*, which are controlled step by step by magnet SA. The stepping magnets SA and SB are of the indirect type, i.e. they do not actuate their wipers upon energization, but only move them to the next contact set on interruption of the circuit by opening contacts *sa'* and *sb'*. The series of contacts for each of the stepping switches or magnets SA and SB, in which all but the first contact of each series are connected together, is provided to de-energize the circuit of the corresponding magnet when the answering relay de-energizes, to close the contacts *ba''* and *ba'''* to return the stepping magnets SA and SB ot their home positions. Connected to each of the wipers operating over these series of contacts are normally closed switches *sa'* and *sb'*, respectively, to break the circuit to the respective stepping magnets SA and SB, because these magnets only step when their circuits are broken.

The tariff zone meter TZO has an output relay T and is connected to five commutators A–E, mounted on one shaft connected to a gear box GB, which gear box is driven by a shaft 8, 9 or 10 of Fig. 1, and each commutator is divided into equal parts I, II, III, and IV. The opening and closing of the contacts is illustrated by Fig. 3 in conjunction with Fig. 4.

Normally the wipers *sa* and *sb* are on their contacts 1. After the completion of a call, the metering wire 1 of the calling subscriber is connected via the wiper of line finder OZ (Fig. 1) to the positive terminal of the battery via contact *t* (Fig. 3), this connection being established in such periods as correspond with the tariff conditions.

These conditions involve a single impulse on completion of a call, an impulse of a value of 1, 4 or 8 according to the zone at the end of a free period occurring about 5 to 10 seconds after a call connection has been made but before the tariff rate starts, and single impulses occurring every 60, 30 or 10 seconds according to the relevant zone.

The relay T will be energized via those contacts $z_a$, $z_b$, $z_c$ that are closed according to the zone after the completion of the call, $z_c$ corresponding to the most expensive zone, which will be clear from the connection of tariff contacts *tc* (i.e. contacts 1'' through 12'' in Figure 3).

The zone meter works as follows: When a call is established, one of the contacts $z_a$, $z_b$, or $z_c$ is closed by its corresponding zoning relay ZA, ZB, or ZC, respectively, as well as contact *ba'* (similar to contact *ba* in Fig. 1). This closing may take place in any of the intervals I–IV of Fig. 4, according to the instantaneous position of the commutators A through E. If it occurs in the intervals or positions II or IV, the magnet SA (shown as a square)

is energized, and the wipers *sa* step to contacts 2, when the circuit is again broken by the commutator passing to the position III or I. Via the contact 2 and segment I or III of commutator B, the magnet SA is energized, so that the wipers make a step after the interruption of this energization during the further rotation of commutator B. It will be apparent on inspection that the first step of magnet SA will take place at the most 2½ secs. (=2×1¼ secs.) after the closure of contact *ba* (which occurs at arbitrary moments with respect to the commutator phase) and at its earliest possible time immediately after the closure of contact *ba*. If contingent differences between the energization and release times of magnet SA are neglected, it will be seen that the wipers will be at contact 2 for about 1¼ sec. During this interval, the relay T will be energized in a circuit running from the ground at contact 2, through wiper *sa* to one of the zone contacts $z_a$–$z_c$, and finally to relay winding T to the battery. Contact *t* will cause the recording of a first charge dependent on the zone.

After three steps, the switch SA will be under the control of commutator C and, consequently, stop on each of the contacts 3, 4 and 5. At the last mentioned contact 5, the relay T will be energized again. The original circuit was interrupted when the wipers left contact set 2. This second operation will be under the control of commutator C (if $z_a$ had been closed for the lowest zone), or under the control of commutator E (if instead $z_c$ has been closed for the highest zone), or under the control of commutator D (in the remaining case of contact $z_b$ being closed). It should be observed that the circuit for closing each of the *z*-contacts by their corresponding ZA–ZB and ZC relays in the tariff-zone repeater has not been shown, in that when a called subscriber answers, one of these relays operates depending upon the zone in which that call is located with reference to the calling subscriber.

The values attributed to the closure of each of these contacts are indicated in Fig. 4 by means of Arabic numbers right above the contact designations in Roman numbers, which correspond to the numbers at the segments or traffic contacts 1'' through 12'' or *tc* in Fig. 3. This importance or weighted value for different pulses influences the operating periods of relay T. The last operating period occurs 5 seconds after the wipers *sa* reach contact set 5 (in the case of energization via commutator C), after 2½ seconds (in the case of energization via commutator D), and practically immediately (in the case of energization via commutator E); the duration of the operation of relay T is regularly about 1¼ seconds. Irrespective of whether the energization is determined by C, D, or E there will always be a period in the energizing interval of the relay T at which a calling line finds its metering contact in the bank of line finder OZ connected via the timing circuit of Fig. 1 to the drum and the adding device, as in this case the period of the timing circuit amounts to 1¼ seconds, during which interval all the subscribers' lines the tariff-zone repeater is provided for are successively connected to the adding device and to the drum.

Of the commutators C, D and E, the one controlling the T-relay, via one of the actuated zone contacts $z_a$, $z_b$ or $z_c$, controls at the same time one of the impulse filters or gates $IP_3$, $IP_4$ and $IP_5$, as a result of which the metering impulse can pass from contact *t* via the timing circuit (Fig. 1) to the impulse gate $IP_1$ and to the combination of impulse gates $IP_3$, $IP_4$, and $IP_5$ and delay circuits $D_1$, $D_2$, which ends in conductor 7.

The working of this combination is as follows: Supposing one of the zone contacts $z_a$, $z_b$, or $z_c$ has been closed (after completion of the call), relay T will operate in one of the periods determined by the commutators C, D, or E. During the period of energization of relay T, a metering impulse will be led from contact *t* via the timing circuit (during the period or section of tape on the magnetic drum MT which under the synchronism of the multi-stage timing circuit and input generator $IV_1$ (see Fig. 1) corresponds to the calling subscriber's number); it will arrive at gate $IP_1$ (which is controlled in the same way as indicated with regard to Fig. 1) and be passed without delay to gate $IP_3$, with a delay of $2n$ milliseconds in the delay circuit $D_1$ to gate $IP_4$ and with a delay of $3n$ milliseconds in the delay circuit $D_2$ to gate $IP_5$; the quantity $n$ will be specified below.

With regard to the operating periods of relay T, which coincide, successively, with the periods that impulse gates $IP_3$, $IP_4$ and $IP_5$ are opened, these delays can be neglected.

If contact $z_a$ is closed for a call in the lowest zone, relay T will operate under the control of commutator C; the metering impulse will arrive at $IP_3$ in the interval that this gate is opened by the control impulse originating from commutator C. If contact $z_c$ is closed for a call in the highest zone, relay T will operate under the control of commutator E and the metering impulse will arrive at impulse gate $IP_5$ in the interval that this gate is opened by the control impulse originating from commutator E. The impulses arriving at the other gates will find these gates closed. The period of revolution of the drum for scanning a complete revolution of a tape thereon is in this case 1¼ seconds.

It results from the above that with each revolution of the drum (which one is irrelevant of course) a metering impulse for the same subscriber always arrives on the same part of the drum track, but with a delay of $2n$ milliseconds for calls in the intermediate zone, of $3n$ milliseconds for calls in the highest zone, and instantaneously or zero milliseconds for calls in the lowest zone.

As has been described before the digits of the lowest importance or weighted value are recorded first on the part of the drum destined for the metering total of a given subscriber. The interval of $n$ milliseconds is the lapse of time between digits of successive order. Consequently, in $n$ milliseconds the value of an impulse to be recorded will be doubled (recording is done in the binary system), in $2n$ milliseconds it will be multiplied by 4 (its logarithm will be doubled) in $3n$ milliseconds its logarithm will be trebled, and in general its logarithm will be in a proportion to the delay as indicated on the upper line of Fig. 4; this result from the essence of the binary registration and from the fact that the lowest digit is recorded first in this case.

The operations described above eventually come to an end at the moment that the current flowing from commutator C via contact 5', wiper *sa* and magnet SA is interrupted by commutator C. From now on magnet SB is energized every 5 seconds in a circuit running from commutator C via wiper *sa* on contact 6''', magnet SB to the battery.

After the first interruption of this current by commuator C, wipers *sb* will be at contacts 2, ten seconds later at contact 3, etc. The bank contacts *tc* are multipled in pairs for the highest zone, in groups of six for the intermediate zone and in dozens for the lowest zone. As a result of this, relay T delivers a single impulse (via impulse gate $IP_3$) to the adding device, notably every 10 seconds for the highest zone, every 30 seconds for the intermediate zone and every minute for the lowest zone. The *tc* tank contacts are arranged in circles and in this way metering goes on uninterruptedly.

Recapitulating it can be said that metering occurs according to the following time division:

(1) At moment 0: for zone *a*, *b* and *c* zone contacts, $z_a$, $z_b$ or $z_c$ and $b_a'$ are closed;

(2) From 0–2½ seconds to 1¼–3¾ seconds: wiper *sa* is on contact 2 and relay T operates to send a single metering pulse through the circuit of Fig. 1, and then via intervals I or III and impulse gate $IP_3$ to the adding device OD;

(3) From 1¼–3¾ seconds to 6¼–8¾ seconds: wiper

*sa* is on contact 3, during which time nothing happens and free time is given to the subscriber;

(4) From 6¼–8¾ seconds to 11¼–13¾ seconds: wiper *sa* is on contact 4, during which time nothing happens and free time is given to the subscriber; and (5) From 11¼–13¾ seconds to 16¼–18¾ seconds: wiper *sa* is on contact 5, when a metering impulse is sent out by relay T to the adding device OD.

If the plays in this survey are too large, a pattern of drum cycles having a finer division can be used, which requires more apparatus as commutators, etc.

Thus, in the circuit according to Fig. 3 when a subscriber makes a call, he is connected to the drum MT during the whole duration of the call, upon which drum is recorded first a given number of paying units and then additional paying units at equal intervals of time thereafter, the weighted values of which unit depend upon the distance of the call, controlled by the zoning relays ZA, ZB, and ZC.

In order to make the system completely operable, the tariff records in the different sections of the drum MT assigned to different subscribers or their numbers, must be able to read from the drum at the billing period to determine the bill or tariff to be charged to each subscriber for their service. Thus, a reading out device ROD is shown in a box in Fig. 1 which must be connected both to the different subscribers' numbers entering the synchronizing device and input generator $IV_1$, and to the loop circuit 13, which reading out device ROD may also include means for converting the pulses read from the drum corresponding to each subscriber, into printed words on cards or bills, with the corresponding subscriber's number also printed thereon with the total amount he should be charged for his service.

While I have illustrated and described what I regard to be the preferred embodiment of my invention, nevertheless it will be understood that such is merely exemplary and that numerous modifications and rearrangements may be made therein without departing from the essence of the invention, I claim:

1. In a telecommunication system having a plurality of subscribers, each subscriber having: a metering wire, connecting circuits for connecting any two of said subscribers in said system, an exchange to which at least a group of subscribers are connected, and a metering circuit in said exchange for valuing calls between two subscribers according to their duration and tariff zone, said metering circuit comprising: a tariff circuit connected to each connecting circuit of a calling subscriber of said exchange including means for producing time metered impulses on the metering wire of said calling subscriber, a zone marking means connected to said traffic circuit and controlled by the called subscriber for indicating the zone corresponding to said call, a reduction circuit connected to said metering wires, an impulse generator connected to said reduction circuit to successively scan said metering wires for metered impulses, a distributor connected to and controlled by said impulse generator for controlling said metered impulses from said traffic circuit in different time intervals controlled by said zone marking means, a rotating magnetic drum divided into sections corresponding to each subscriber of said exchange for recording cumulative totals of said metered impulses, said drum being connected to and synchronized with said impulse generator and said distributor, each section of said drum being divided into equal parts corresponding to the different zone related time intervals produced by said distributor; a gating means connected to and controlled by said impulse generator, said distributor, and said reduction circuit for passing metered impulses for recordation on said drum in said zone related parts selected by said distributor in said sections corresponding to each subscriber, a recorder for recording said metered impulses on said drum, a reader spaced in advance of said recorder for reading the impulses already recorded on said drum, an adder connected between said reader and said recorder and to said gating means for adding the gated metered impulses to those read from the corresponding zone related part of each section on said drum, and a delay device connected between said adder and said recorder for compensating for the time the drum takes to rotate through said space from said reader to said recorder to insure recordation of said cumulative metered impulses in the corresponding subscriber's zone related section part.

2. A system according to claim 1 wherein said gating means comprises a plurality of gating circuits each having an input and being connected in parallel between said reduction circuit and said adder, and additional delay devices between the inputs of adjacent ones of said gating circuits which delay devices correspond to zone related time parts on earth subscriber's section on said drum.

References Cited in the file of this patent

UNITED STATES PATENTS

| | | |
|---|---|---|
| 2,513,112 | Shepherd | June 27, 1950 |
| 2,594,495 | Retallack | Apr. 29, 1952 |
| 2,596,741 | Tyler | May 13, 1952 |
| 2,667,538 | Wright et al. | Jan. 26, 1954 |
| 2,668,875 | Shepherd | Feb. 9, 1954 |
| 2,700,148 | McGuigan et al. | Jan. 18, 1955 |
| 2,738,382 | Brooks | Mar. 13, 1956 |
| 2,749,037 | Stibitz | June 5, 1956 |
| 2,764,634 | Brooks | Sept. 25, 1956 |
| 2,782,256 | Malthaner | Feb. 19, 1957 |
| 2,865,563 | Wright et al. | Dec. 23, 1958 |